(12) United States Patent
Ljung

(10) Patent No.: US 11,564,201 B2
(45) Date of Patent: Jan. 24, 2023

(54) PAGING ON AN OPEN SPECTRUM

(71) Applicant: Sony Corporation, Tokyo (JP)

(72) Inventor: Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/968,823

(22) PCT Filed: Feb. 18, 2019

(86) PCT No.: PCT/EP2019/053983
§ 371 (c)(1),
(2) Date: Aug. 10, 2020

(87) PCT Pub. No.: WO2019/158757
PCT Pub. Date: Aug. 22, 2019

(65) Prior Publication Data
US 2021/0007076 A1  Jan. 7, 2021

(30) Foreign Application Priority Data
Feb. 16, 2018 (SE) .................................. 1830052-5

(51) Int. Cl.
H04W 4/00 (2018.01)
H04Q 11/00 (2006.01)
H04W 68/00 (2009.01)
H04W 76/28 (2018.01)
H04W 16/14 (2009.01)
(Continued)

(52) U.S. Cl.
CPC ......... *H04W 68/005* (2013.01); *H04W 16/14* (2013.01); *H04W 56/0015* (2013.01); *H04W 74/0808* (2013.01); *H04W 76/28* (2018.02)

(58) Field of Classification Search
CPC ............... H04W 68/005; H04W 76/28; H04W 16/14; H04W 56/0015; H04W 74/0808; H04W 68/02
USPC .......................................................... 370/329
See application file for complete search history.

(56) References Cited

U.S. PATENT DOCUMENTS

| 2005/0208966 A1* | 9/2005 | David | H04L 12/12 |
| | | | 455/553.1 |
| 2010/0284387 A1* | 11/2010 | Zhao | H04W 4/203 |
| | | | 370/338 |

(Continued)

FOREIGN PATENT DOCUMENTS

| CN | 107071903 A | 8/2017 |
| WO | 2017063359 A1 | 4/2017 |

(Continued)

OTHER PUBLICATIONS

International Search Report and Written Opinion from corresponding International Application No. PCT/EP2019/053983, dated Apr. 24, 2019, 13 pages.

(Continued)

*Primary Examiner* — Mark G. Pannell
(74) *Attorney, Agent, or Firm* — Tucker Ellis LLP

(57) ABSTRACT

A method comprises transmitting, to a terminal (101), at least one synchronization signal burst (150) in a time-limited channel access interval (405) of an open spectrum (409). The method further comprises transmitting, to the terminal (101), at least one paging signal (4004, 4005) in the channel access interval (405) of the open spectrum (409).

16 Claims, 14 Drawing Sheets

(51) Int. Cl.
*H04W 56/00* (2009.01)
*H04W 74/08* (2009.01)

(56) References Cited

U.S. PATENT DOCUMENTS

| | | | |
|---|---|---|---|
| 2012/0327790 A1* | 12/2012 | Lee | H04W 72/1215 |
| | | | 370/252 |
| 2014/0128082 A1* | 5/2014 | Chirayil | H04W 36/38 |
| | | | 455/438 |
| 2015/0043523 A1 | 2/2015 | Luo | |
| 2015/0250002 A1* | 9/2015 | Sun | H04W 74/0808 |
| | | | 370/329 |
| 2016/0073366 A1 | 3/2016 | Ng et al. | |
| 2016/0150474 A1* | 5/2016 | Ang | H04W 52/0293 |
| | | | 370/311 |
| 2017/0230933 A1 | 8/2017 | Radulescu | |
| 2017/0257842 A1 | 9/2017 | Hessler et al. | |
| 2018/0115996 A1* | 4/2018 | Si | H04W 74/0808 |
| 2018/0192404 A1* | 7/2018 | Maaref | H04L 5/0048 |
| 2018/0241494 A1* | 8/2018 | Chendamarai Kannan | |
| | | | H04J 11/0073 |
| 2018/0254796 A1* | 9/2018 | Akkarakaran | H04B 7/2656 |
| 2018/0324753 A1* | 11/2018 | Islam | H04W 68/025 |
| 2018/0376454 A1* | 12/2018 | Strom | H04L 27/2602 |
| 2019/0037509 A1* | 1/2019 | Li | H04L 5/001 |
| 2019/0045481 A1* | 2/2019 | Sang | H04B 1/713 |
| 2019/0069271 A1* | 2/2019 | Reial | H04W 72/005 |
| 2019/0104498 A1* | 4/2019 | Jung | H04W 68/005 |
| 2019/0141670 A1* | 5/2019 | Frederiksen | H04W 68/005 |
| 2019/0190668 A1* | 6/2019 | Lei | H04W 74/085 |
| 2019/0191457 A1* | 6/2019 | Si | H04W 48/12 |
| 2019/0327123 A1* | 10/2019 | Wang | H04J 11/0079 |
| 2019/0387412 A1* | 12/2019 | Kim | H04L 5/001 |
| 2020/0053781 A1* | 2/2020 | Pan | H04J 11/0069 |
| 2020/0187250 A1* | 6/2020 | Bhattad | H04W 16/28 |
| 2020/0359426 A1* | 11/2020 | Pan | H04W 16/14 |
| 2021/0153162 A1* | 5/2021 | Chen | H04W 56/001 |

FOREIGN PATENT DOCUMENTS

| | | |
|---|---|---|
| WO | 2017105305 A1 | 6/2017 |
| WO | 2017145120 A1 | 8/2017 |
| WO | 2017162813 A1 | 9/2017 |
| WO | 2017184927 A1 | 10/2017 |
| WO | 2017190269 A1 | 11/2017 |
| WO | 2018014256 A1 | 1/2018 |

OTHER PUBLICATIONS

Sony, "NR unlicensed design considerations", 3GPP TSG RAN WG1 Meeting #92, R1-1802066, Feb. 17, 2018, 4 pages.

Multefire Alliance, "MulteFire Release 1.0 Technical Paper", Sep. 22, 2017, 25 pages.

Vivo, "Design considerations for standalone operation in NR unlicensed spectrum", 3GPP TSG RAN WG1 Meeting #92, R1-1801558, Feb. 26-Mar. 2, 2018, 4 pages.

Office Action from corresponding Japanese Application No. 2020-543777 dated Nov. 2, 2021.

"Motivation For Standalone LTE Operation And Dual Connectivity Operation In Unlicensed Spectrum" 3rd Generation Partnership Project (3GPP), Ericsson, Mar. 2016, Goteborg, Sweden, RP-160202, 5 pages.

* cited by examiner

PAGING ON AN OPEN SPECTRUM

TECHNICAL FIELD

Various examples of the invention generally relate to paging of terminals using paging signals communicated on an open spectrum. Various examples specifically relate to open spectrum access strategies in this regard.

BACKGROUND

To facilitate efficient spectrum usage and high data rates, wireless communication on unlicensed bands is possible. An unlicensed band may reside in an open spectrum. Multiple operators or networks may share access to the open spectrum. In other words, access to the open spectrum may not be restricted to a single operator or network. Typically, the wireless communication on the open spectrum may involve procedures and limitations due to the possibility of multiple networks sharing the same spectrum. Such techniques are sometimes also referred to as clear channel assessment techniques, e.g. Carrier Sense Multiple Access/Collision Avoidance (CSMA/CA). Other techniques to ensure that multiple networks can share the same spectrum may include, but is not limited to limitations on maximum percentage of transmissions per time unit (limited transmission duty cycle), limitations on maximum transmission output power and limitations on the maximum channel occupancy time per transmission. The required techniques may differ depending on regulatory requirements for the open spectrum, and the requirements may be different depending on the specific frequency spectrum as well as the geographic location of the device. Throughout this description, any such procedure to perform required techniques imposed due to multiple access restrictions on the open spectrum is denoted as a listen-before-talk (LBT) procedure.

When performing an LBT procedure attempting to transmit over the open spectrum, taking the required techniques for multiple networks to share the spectrum into account, a network node may conclude via the LBT procedure that is currently not able to communicate with the intended receiver at the intended time. The network node may be limited by any transmission regulation related to the sharing of the open spectrum, and we will here refer this unsuccessful transmission as an LBT failure. When the LBT failure occurs, the transmitter may need to wait until the limitation imposed by the sharing technique is no longer restricting the communication. Such waiting may impose a timer, or an evaluation of a limiting parameter as per the given examples above. Such waiting is referred to as a backoff procedure throughout this description. Hence failure of a LBT procedure may introduce communication delays.

For wireless communication, on the other hand, to limit energy consumption, idle mode operation is known. Here, a terminal (UE) does not maintain an active data connection with the network. To reach the UE, paging is employed. Paging includes communication of one or more paging signals, typically including a paging indicator and a paging message. Typically, paging is executed while the UE operates in idle mode. An receiver of a modem of the UE can be configured to selectively receive paging signals in idle mode.

It has been observed that the latency of paging a UE can significantly increase when communicating the one or more paging signals on the open spectrum. As mentioned above, this may be due to the network node not being able to transmit paging signals at the intended time due to LBT failure and associated back-off procedures, possible in connection with discontinuous reception (DRX) of the UE.

SUMMARY

Therefore, a need exists for advanced techniques of accessing the open spectrum for paging of a UE. Specifically, a need exists for techniques which overcome or mitigate at least some of the above-identified restrictions and drawbacks.

This need is met by the features of the independent claims. The features of the dependent claims define embodiments.

A method includes transmitting at least one synchronization signal (SS) burst in a time-limited channel access interval of an open spectrum. The at least one SS burst is transmitted to a terminal. The method also includes transmitting at least one paging signal in the channel access interval of the open spectrum. The at least one paging signal is transmitted to the UE.

Sometimes, an SS burst is also referred to as SS block.

A method includes receiving at least one SS burst in a time-limited channel access interval of an open spectrum. The at least one SS burst is received from a BS. The method also includes receiving at least one paging signal in the channel access interval of the open spectrum. The at least one paging signal is received from the BS.

A method of operating a terminal includes implementing a first reception attempt. The first reception attempt is on an open spectrum. The first reception attempt is for at least one synchronization signal burst. The method also includes implementing a second reception attempt. The second reception attempt is on the open spectrum. The second reception attempt is for at least one paging signal. The first reception attempt and the second reception attempt are implemented in a common, time-limited channel access interval of the open spectrum.

A method includes transmitting and/or receiving (communicating) at least one SS in a time-limited channel access interval of an open spectrum. The at least one SS burst is communicated from a base station (BS) to a UE. The method also includes communicating at least one paging signal in the channel access interval of the open spectrum. The at least one paging signal is communicated from the BS to the UE.

A computer program product or computer program includes program code. The program code can be executed by at least one processor. Executing the program code causes the at least one processor to perform a method. The method includes transmitting at least one SS burst in a time-limited channel access interval of an open spectrum. The at least one SS burst is transmitted to a terminal. The method also includes transmitting at least one paging signal in the channel access interval of the open spectrum. The at least one paging signal is transmitted to the UE.

A computer program product or computer program includes program code. The program code can be executed by at least one processor. Executing the program code causes the at least one processor to perform a method. The method includes receiving at least one SS burst in a time-limited channel access interval of an open spectrum. The at least one SS burst is received from a BS. The method also includes receiving at least one paging signal in the channel access interval of the open spectrum. The at least one paging signal is received from the BS.

A computer program product or computer program includes program code. The program code can be executed by at least one processor. Executing the program code causes the at least one processor to perform a method. The method includes implementing a first reception attempt. The first reception attempt is on an open spectrum. The first reception attempt is for at least one synchronization signal burst. The method also includes implementing a second reception attempt. The second reception attempt is on the open spectrum. The second reception attempt is for at least one paging signal. The first reception attempt and the second reception attempt are implemented in a common, time-limited channel access interval of the open spectrum.

A computer program product or computer program includes program code. The program code can be executed by at least one processor. Executing the program code causes the at least one processor to perform a method. The method includes transmitting and/or receiving (communicating) at least one SS burst in a time-limited channel access interval of an open spectrum. The at least one SS burst is communicated from a BS to a UE. The method also includes communicating at least one paging signal in the channel access interval of the open spectrum. The at least one paging signal is communicated from the BS to the UE.

A base station includes control circuitry. The control circuitry is configured to perform a method. The method includes transmitting at least one SS burst in a time-limited channel access interval of an open spectrum. The at least one SS burst is transmitted to a terminal. The method also includes transmitting at least one paging signal in the channel access interval of the open spectrum. The at least one paging signal is transmitted to the UE.

A terminal includes control circuitry. The control circuitry is configured to receive at least one SS burst in a time-limited channel access interval of an open spectrum. The at least one SS burst is received from a BS. The control circuitry is also configured to receive at least one paging signal in the channel access interval of the open spectrum. The at least one paging signal is received from the BS.

A terminal includes control circuitry. The control circuitry is configured to implement a first reception attempt for at least one SS burst on an open spectrum; and implement a second reception attempt for at least one paging signal on the open spectrum. The first reception attempt and the second reception attempt are implemented in a common, time-limited channel access interval of the open spectrum.

A method of operating a terminal includes implementing a first reception attempt in accordance with a timing schedule of a discontinuous reception cycle of the terminal. The first reception attempt is for at least one reference signal transmitted by a base station on an open spectrum.

The method also includes implementing a second reception attempt in accordance with the timing schedule. The second reception attempt is for at least one paging signal transmitted by the base station on the open spectrum. The method also includes selectively activating a backoff for a further first reception attempt for the at least one SS burst and a further second reception attempt for the at least one paging signal, depending on a first result of the first reception attempt.

A computer program product or computer program includes program code. The program code can be executed by at least one processor. Executing the program code causes the at least one processor to perform a method of operating a terminal. The method includes implementing a first reception attempt in accordance with a timing schedule of a discontinuous reception cycle of the terminal. The first reception attempt is for at least one reference signal transmitted by a base station on an open spectrum. The method also includes implementing a second reception attempt in accordance with the timing schedule. The second reception attempt is for at least one paging signal transmitted by the base station on the open spectrum. The method also includes selectively activating a backoff for a further first reception attempt for the at least one reference signal and a further second reception attempt for the at least one paging signal, depending on a first result of the first reception attempt.

A terminal includes control circuitry. The control circuitry is configured to implement a first reception attempt in accordance with a timing schedule of a discontinuous reception cycle of the terminal. The first reception attempt is for at least one reference signal transmitted by the base station on an open spectrum. The method also includes implementing a second reception attempt in accordance with the timing schedule. The second reception attempt is for at least one paging signal transmitted by the base station on the open spectrum. The method also includes selectively activating a backoff for a further first reception attempt for the at least one reference signal and a further second reception attempt for the at least one paging signal, depending on a first result of the first reception attempt.

For example, the reference signal may include a broadcasted signal of the base station, a SS or a SS burst, and/or a fixed preamble of a variable signal transmitted by the base station, etc. Another implementation includes channel sounding signals or DL pilot signals, etc.

A method includes communicating at least one SS in a time-limited channel access interval of an open spectrum. The at least one SS burst is communicated from BS to a UE. The method also includes communicating at least one network access signal in the channel access interval of the open spectrum. The at least one network access signal is communicated from the BS to the UE and/or from the UE to the BS.

The at least one network access signal may facilitate connection of the UE to a network of the BS. For example, the at least one network access signal may facilitate setup of a data connection between the UE and the BS, e.g., a Layer 3 bearer, etc. For example, the at least one network access signal may facilitate transition from an idle operational mode of the UE to a connected operational mode of the UE. The at least one network access signal may include at least one of the following: a random access (RA) message of a RA procedure; a RA preamble transmitted in an UL RA message 1; a DL RA message 2, e.g., for responding to the UL RA message 1 and including a temporary identity of the UE; an UL RA message 3, e.g., for setup of a Layer 3 data connection; a DL RA message 4, e.g., for responding to the UL RA message 3.

For example, a 2-step or 4-step RA procedure can be employed.

By concatenating the at least one SS and the at least one network access signal into the common channel access interval, it may be possible to conclude the network access within a shorter time duration, e.g., within fewer LBT attempts.

A UE includes control circuitry. The control circuitry is configured to receive at least one SS in a time-limited channel access interval of an open spectrum. The at least one SS burst is communicated from a BS to the UE. The control circuitry is also configured to communicate at least one network access signal in the channel access interval of the open spectrum. The at least one network access signal is communicated from the BS to the UE and/or from the UE to the BS.

A BS includes control circuitry. The control circuitry is configured to transmit at least one SS in a time-limited channel access interval of an open spectrum. The at least one SS burst is communicated from the BS to a UE. The control circuitry is also configured to communicate at least one network access signal in the channel access interval of the open spectrum. The at least one network access signal is communicated from the BS to the UE and/or from the UE to the BS.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
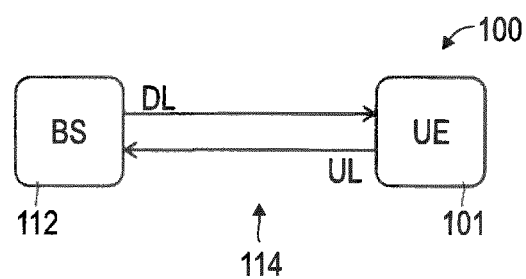
FIG. 1 schematically illustrates a network according to various examples, the network including a BS and a UE.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof. Same reference signs in the various drawings refer to similar or identical components, functions or actions.

Hereinafter, techniques of wireless communication are described. Specifically, techniques are described which allow for wireless communication on an open spectrum. Here, time-frequency resources are typically not centrally scheduled. Therefore, LBT and backoff is employed in case of a failed transmission attempt to avoid collision between multiple devices attempting to access the open spectrum contemporaneously.

Techniques are described which facilitate operation of a UE in idle mode. In idle mode, a data connection is not maintained. This helps to reduce the energy consumption of the UE. This may be helpful, inter alia, for Machine Type Communication (MTC) or Internet of Things (IOT) devices that typically have a limited battery capacity. Also other devices may benefit from operation in idle mode. In idle mode, the UE can typically operate using a DRX cycle including OFF durations and ON durations according to a respective timing schedule. During the OFF durations, a receiver of an interface of the UE can be in an inactive state. The receiver may be unfit to receive any data. Thereby, energy consumption can be reduced. The ON durations correlate with paging occasions (POs) during which the receiver is operated in an active state in which it is fit to receive paging signals.

Specifically, according to various examples, techniques are described which facilitate paging of UEs in idle mode using paging signals communicated on the open spectrum. For successful paging, typically three signals need to be transmitted: first, one or more SSs, e.g., an SS burst; second, a paging indicator; and, third, a paging message. Hereinafter, reference is made to paging signals which include, both, the paging indicator and the paging message. Each SS burst may include multiple SS blocks; each SS block may include multiple SSs, e.g., different kinds of SSs such as primary SSs (PSSs), secondary SSs (SSSs), Physical Broadcast Channel Demodulation Reference signals (PBCH-DMRS).

Various techniques are based on the finding that in such a scenario communication of the SS burst and the paging signals on an open spectrum can be difficult. Namely, according to reference implementations, three transmission attempts including LBT are required to be successful before all three signals can be delivered. If any one of the three transmission attempts fails, paging will be delayed due to the respective backoff. Although it is generally possible to define a PO that takes into account LBT-related delay—e.g., due to the backoff procedure—specifically in combination with DRX operation of the UE, there is a risk that the latency due to a failed transmission attempt is defined by the comparably long OFF duration of the timing schedule of the DRX cycle. This can result in a significant delay in paging, e.g., for MTC or IOT up to minutes or even hours. This is because a PO can pass and the next PO is only after the OFF duration of the DRX cycle.

From the Third Generation Partnership Project (3GPP) R1-1715582 contribution of the meeting RAN1 #90-Bis an implementation is known where multiple SS bursts are transmitted to save LBT overhead. The reduction of LBT overhead increases the likelihood of successful paging of the UE within a single PO. Nonetheless, a significant likelihood of unsuccessful paging within a single PO results. The techniques described herein facilitate reliable paging within a single PO.

According to various examples, this is achieved by concatenating one or more SS bursts and one or more paging signals into a channel access interval of the open spectrum.

The channel access interval may limit the maximum time that any given device may continuously access the open spectrum. Typically, the beginning of the channel access interval is defined by the start of transmitting on the open spectrum; and the end of the channel access interval (sometimes also referred to as Maximum Channel Occupancy Time, MCOT) is defined by a preset maximum time duration according to access rules of the open spectrum, i.e., regulatory requirements. Typical durations of channel access intervals can be in the range of 10 ms-1 s.

Such an approach facilitates a single transmission attempt for transmitting, both, SSs for the UE acquiring synchronization, as well as one or more paging signals such as the paging indicator and optionally the paging message. Hence, a single LBT procedure may be sufficient to complete paging of the UE. This facilitates paging within a single PO.

In order to fit these signals into the MCOT, it is possible to expand transmission into frequency domain. For example, frequency division duplexing (FDD) of multiple signals can be employed. For example, FDD of multiple SS blocks or even multiple SS bursts can be employed. Alternatively or additionally, FDD of multiple paging signals can be employed, e.g., FDD for paging indicators and FDD for paging messages.

Typically, the amount of required information can be larger for the paging message than for the paging indicator; likewise, the amount of information required for the paging indicator can be larger than for the SS burst. Hence, the bandwidth can increase towards the end of the MCOT, along with the increasing size of information to be conveyed. This increase of required frequency bandwidth from SS burst to paging information could therefore be seen as an asymmetric resource need, since the required transmit resources in frequency domain is varying and not symmetric along the different transmission types.

By employing FDD for SSs—e.g., for SS bursts—frequency diversity can be achieved. This can reduce the asymmetric resource need for combined SSs broadcast and paging transmission. This can help to efficiently occupy the open spectrum.

This is based on the following finding: there may be a tendency that asymmetric resource need results in small-scale fractions of occupied physical time-frequency resource elements or resource blocks. Sometimes, individual resource elements or resource blocks cannot be addressed by scheduling, because scheduling information is based on a collective addressing scheme for multiple resource elements or blocks, so-called resource block groups (RBGs). The small-scale fractions of the resource elements or blocks are likely to not coincide with the RBGs. This is different where a symmetric resource need exists that avoids small-scale fractions of resource elements or blocks.

FDD may not be required to be activated for all SSs, but rather selectively for SSs aligned with a PO, i.e., where SSs are communicated within a PO. Then, further SSs or SS bursts can be interleaved with the SSs or SS bursts in a PO which further SSs or SS bursts occupy a smaller bandwidth.

By such techniques, the UE can effectively re-sync—i.e., re-acquire timing synchronization—and identify possible paging within a single PO, i.e., within a single instance of receiver activity. If the UE detects the SS burst transmission, it can conclude on an in-coverage scenario. Then, the UE can continue to listen for paging signals. Then, if the paging is detected, the UE can continue with a random access (RA) procedure that may require LBT implemented by the UE.

At the same time, an unsuccessful transmission attempt of the BS for transmission of the SS burst and the paging signals may be reliably detected by the UE. This may be due non-reception of the one or more SS bursts. Then, a tailored backup procedure can be implemented by the UE.

In detail, typically a PO is associated with a certain time duration during which the UE expects the network to transmit paging signals. According to reference implementations, in case of failed transmission attempt due to LBT at the BS, the network and UE wait for the next PO. Typically, the backoff duration is longer than the duration of the PO. Since PO periodicity is associated with the DRX cycle timing schedule, the time offset between subsequent POs corresponds typically to the OFF duration, i.e., seconds, minutes, or even hours. Thus, a failed transmission attempt due to an occupied open spectrum, i.e., channel access of one or more other devices, can have a significant impact on latency in reference implementations. On the other hand, there are scenarios conceivable where the BS does not attempt to transmit any paging signals, at all, simply because no UE is being paged. Then, the UE does not receive any corresponding signal. Thus, the UE may falsely assume that a transmission attempt of the BS failed; while, in fact, the BS never intended to transmit. This creates ambiguity and, depending on the specific implementation of the backup procedure, can result in wasted energy.

In the scenarios described herein, the UE can detected a failed transmission attempt based on the absence of any signal in the MCOT, including SSs. Thus, the UE may implement a first reception attempt for at least one reference signal and may implement a second reception attempt for at least one paging signal. The reference signal may be any signal that the UE expects to be transmitted by the BS in case the transmission attempt succeeds. For example, a SS or SS burst could be an implementation of the reference signal. Another implementation includes channel sounding signals or DL pilot signals, etc. Then, depending on the results of the first reception attempt and the second reception attempt, different backup procedures may be taken. In one example, the UE, in response to determining failed transmission attempt based on the result of the first reception attempt, the UE can activate an backoff. This may include, e.g., a shorter OFF duration of the DRX cycle or even keeping the receiver in an active state until the next PO.

FIG. 1 schematically illustrates a wireless communication network 100 that may benefit from the techniques disclosed herein. The network may be a 3GPP-standardized network such as 3G, 4G-LTE, or upcoming 5G-NR. Other examples include point-to-point networks such as Institute of Electrical and Electronics Engineers (IEEE)-specified networks, e.g., the 802.11x Wi-Fi protocol or the Bluetooth protocol. Further examples include 3GPP Narrowband Internet of Things (NB-IoT or enhanced Machine Type Communication (eMTC) networks.

The network 100 includes a BS 112 and a UE 101. A wireless link 114 is established between the BS 112 and the UE 101. The wireless link 114 includes a DL link from the BS 112 to the UE 101; and further includes an UL link from the UE 101 to the BS 112. Time-division duplexing (TDD), frequency-division duplexing (FDD), space-division duplexing (SDD), and/or code-division duplexing (CDD) may be employed for mitigating interference between UL and DL. Likewise, TDD, FDD, SDD, and/or CDD may be employed for mitigating interference between multiple UEs communicating on the wireless link 114 (not shown in FIG. 1).

The UE 101 may e.g. be one of the following: a smartphone; a cellular phone; a tablet; a notebook; a computer; a smart TV; an MTC device; an eMTC device; an IoT device; an NB-IoT device; a sensor; an actuator; etc.

Figure 2:
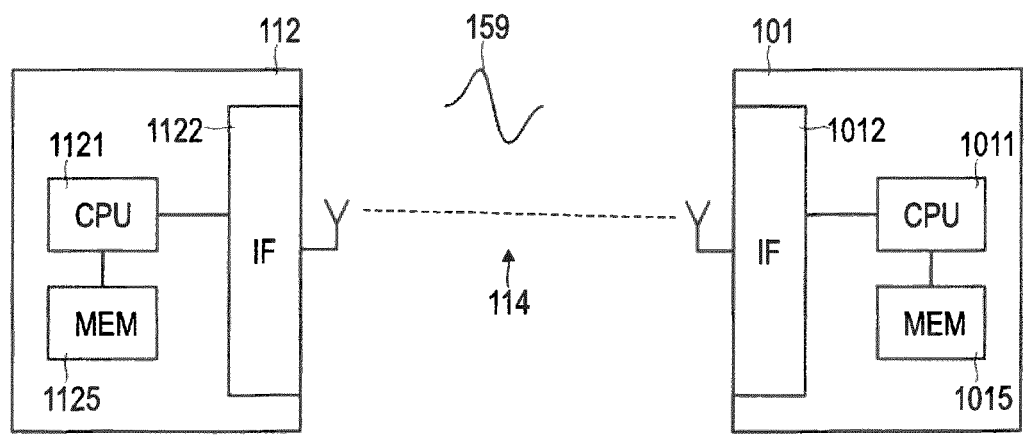
FIG. 2 schematically illustrates the BS and the UE in greater detail according to various examples.

FIG. 2 schematically illustrates the BS 112 and the UE 101 in greater detail.

The BS 112 includes a processor (CPU) 1121 and an interface (IF) 1122, sometimes also referred to as frontend. The IF 1122 includes a receiver and a transmitter. The BS 112 further includes a memory (MEM) 1125, e.g., a non-volatile memory. The memory may store program code that can be executed by the processor 1121. Thus, the processor 1121 and the memory 1125 form a control circuitry. Executing the program code may cause the processor 1121 to perform techniques with respect to: transmitting on an open spectrum including LBT operation; implementing transmission attempts on the open spectrum; implementing a backoff; transmitting SSs; transmitting paging signals; etc.

The UE 101 includes a processor (CPU) 1011 and an interface (IF) 1012, sometimes also referred to as frontend. The IF 1012 includes a receiver and a transmitter. The UE 101 further includes a memory (MEM) 1015, e.g., a non-volatile memory. The memory 1015 may store program code that can be executed by the processor 1011. Thus, the processor 1011 and the memory 1015 form a control circuitry. Executing the program code may cause the processor 1011 to perform techniques with respect to: receiving on an open spectrum including LBT operation; receiving SSs; receiving paging signals; implementing a reception attempt on the open spectrum; implementing a LBT etc.

FIG. 2 also illustrates an SS 159. The SS 159 is transmitted by the BS 112 and received by the UE 101. The SS 159 facilitates time synchronization between the reference clock of the BS 112 and the clock of the UE 101. This time synchronization is required for the UE 101 being able to decode signals received from the BS 112, e.g., paging signals. The time synchronization helps to align a time-frequency resource grid used by the BS 112 and a time-frequency resource grid used by the UE 101. Sometimes, SSs 159 are clustered into SS bursts (not illustrated in FIG. 2).

Figure 3:
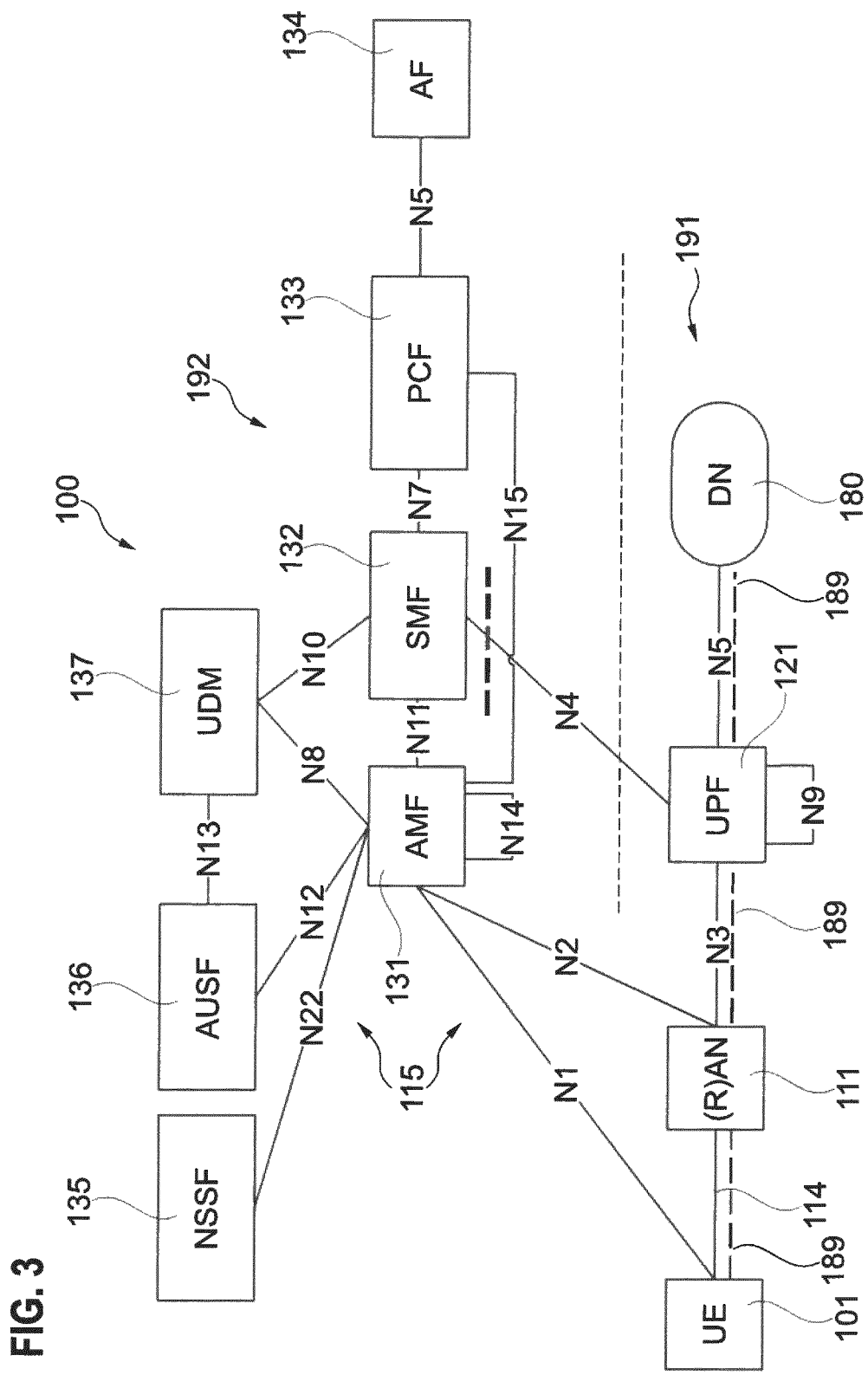
FIG. 3 schematically illustrates an example implementation of the network as cellular network according to various examples.

FIG. 3 schematically illustrates an example implementation of the wireless network 100 in greater detail. The example of FIG. 3 illustrates the wireless network 100 according to the 3GPP 5G architecture. Details of the fundamental architecture are described in 3GPP TS 23.501, version 1.3.0 (2017-09). While FIG. 3 and further parts of the following description illustrate techniques in the 3GPP 5G framework, similar techniques may be readily applied to different communication protocols. Examples include 3GPP LTE 4G and IEEE Wi-Fi technology.

The UE 101 is connectable to the network 100 via a radio access network (RAN) 111, typically formed by one or more BSs 112 (not illustrated in FIG. 3). The wireless link 114 is established between the RAN 111—specifically between one or more of the BSs 112 of the RAN 111—and the UE 101.

The RAN 111 is connected to a core network (CN) 115. The CN 115 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121. In the scenario of FIG. 3, the UPF 121 acts as a gateway towards a data network (DN) 180, e.g., the Internet or a Local Area Network. Application data can be communicated between the UE 101 and one or more servers on the DN 180.

The network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; and a Unified Data Management (UDM) 137. FIG. 3 also illustrates the protocol reference points N1-N22 between these nodes.

The AMF 131 provides one or more of the following functionalities: registration management; NAS termination; connection management; reachability management; mobility management; access authentication; and access authorization the AMF 131 can negotiate a NAS-level security context with the UE 101. See 3GPP TS 23.501 version 1.3.0 (2017-09), section 6.2.1. For example, the AMF 131 controls CN-initiated paging of the UEs 101 if the respective UE 101 operates in a disconnected mode. The AMF 131 may keep track of the timing of a DRX cycle of the UE 101. The AMF 131 may trigger transmission of paging signals to the UE 101 by the BSs 112 of the RAN 111, e.g., in a tracking area to account for UE mobility.

A data connection 189 is established by the AMF 131 if the respective UE 101 operates in a connected mode. To keep track of the current mode of the UEs 101, the AMF 131 sets the UE 101 to Evolved Packet System Connection Management (ECM) connected or ECM idle. During ECM connected, a non-access stratum (NAS) connection is maintained between the UE 101 and the AMF 131. The NAS connection implements an example of a mobility control connection. The NAS connection may be set up in response to paging of the UE 101.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc.

As such, the AMF 131 and the SMF 132 both implement CP mobility management needed to support a moving UE.

FIG. 3 also illustrates aspects with respect to the data connection 189. The data connection 189 is established between the UE 101 via the RAN 111 and the UP 191 of the CN 115 and towards the DN 180. For example, a connection with the Internet or another packet data network can be established. To establish the data connection 189, it is possible that the respective UE 101 performs a random access (RA) procedure, e.g., in response to reception of a paging signal. A server of the DN 180 may host a service for which application data (sometimes also referred to as payload data) is communicated via the data connection 189.

The data connection 189 may include one or more bearers such as a dedicated bearer or a default bearer. The data connection 189 may be defined on the Radio Resource Control (RRC) layer, e.g., generally Layer 3 of the OSI model of Layer 2.

Figure 4:
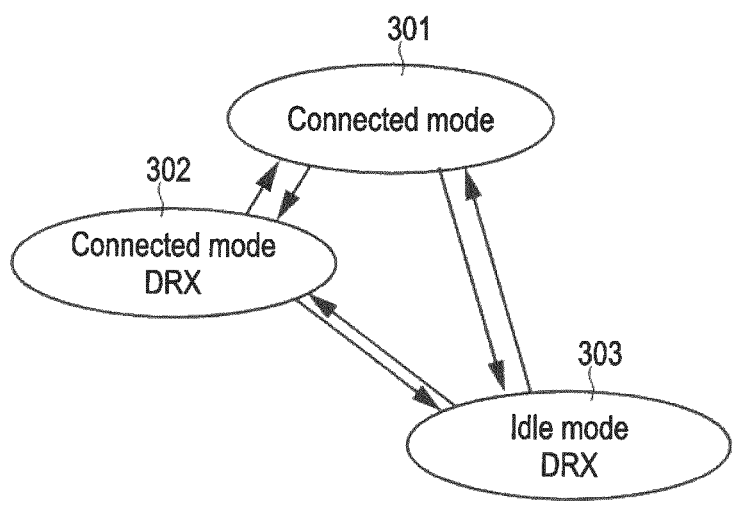
FIG. 4 schematically illustrates multiple modes of operation of a UE according to various examples.

FIG. 4 illustrates aspects with respect to different modes 301-303 in which the UE 101 can operate. Example implementations of the operational modes 301-303 are described, e.g., in 3GPP TS 38.300, e.g., version 15.0.

During connected mode 301, the data connection 189 is setup. For example, a default bearer and optionally one or more dedicated bearers may be set up between the UE 101 and the network 100. The receiver of the UE 101 may persistently operate in an active state.

In order to reduce the power consumption, it is then possible to transition from the connected mode 301 to a connected mode 302 which employs a DRX cycle of the receiver. The DRX cycle includes ON durations and OFF durations, according to a respective timing schedule. During the OFF durations, the receiver is unfit to receive data; an inactive state of the receiver may be activated.

The timing schedule of the DRX cycle is synchronized between the UE 101 and the BS 112 such that the BS 112 can align any DL transmission—e.g., of application data—with the ON durations of the connected mode DRX cycle. The data connection 189 is maintained set-up in mode 302.

To achieve a further power reduction, it is possible to implement in idle mode 303. The idle mode 303 is, again, associated with the DRX cycle of the receiver of the UE 101. However, during the on durations of the DRX cycle in idle mode 303, the receiver is only fit to receive paging indicators and, optionally, paging messages. For example, this may help to restrict the particular bandwidth that needs to be monitored by the receiver during the on durations of the DRX cycles in idle mode 303. The receiver may be unfit to receive application data. This may help to further reduce the power consumption—e.g., if compared to the connected mode 302.

Figure 5:
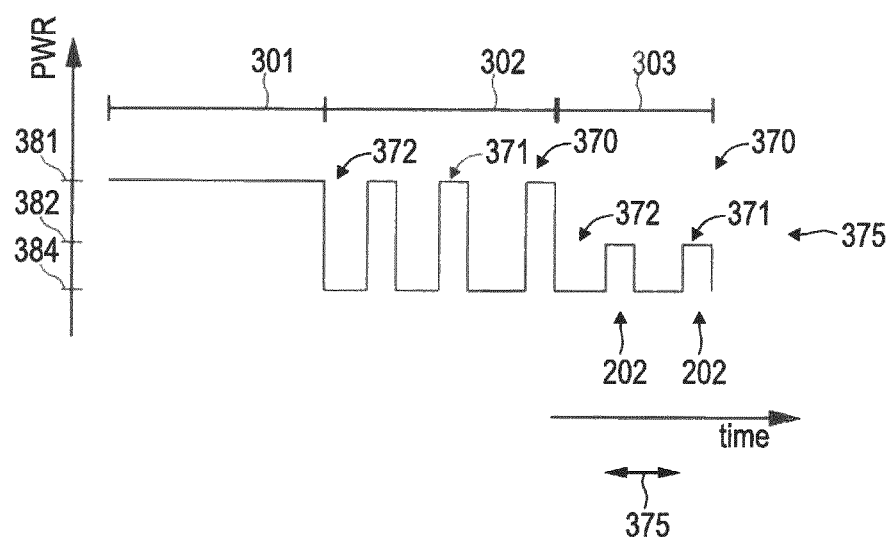
FIG. 5 schematically illustrates receiver states of the UE associated with the modes of operation and activated in accordance with a DRX cycle according to various examples.

FIG. 5 illustrates aspects with respect to transitioning between the different modes 301-303. Furthermore, FIG. 5 illustrates aspects of employing DRX cycles 370. It is possible to employ such techniques in the various examples described herein with respect to communication of paging signals.

First, the UE 101 operates in the connected mode 301. This causes a persistent power consumption at a high level, because the receiver persistently operates in the active state 381. The active state 381 is associated with a certain power consumption. Then, in order to reduce the power consumption, the connected mode 302 employing DRX is activated. Here, the ON durations 371 and the OFF durations 372 of the receiver—selectively operating in the active state 381 and the inactive state 384—are illustrated.

To further reduce the power consumption, next, the idle mode 303 is activated. This is accompanied by releasing the data connection 189. Again, the idle mode 303 employs a DRX cycle 370 including ON durations 371 and OFF durations 372 of a respective timing schedule 375. The ON durations 371 in idle mode 303 are associated with a lower power consumption if compared to the on durations 371 in connected mode 302, because in the idle mode 303, the capability of the receiver, now operating in the active state 382, can be reduced if compared to the connected mode 302. During idle mode 303 when in active state 382, the receiver only expects reception of paging signals. The ON durations 371 of the respective timing schedule 375 are aligned with POs 202.

Figure 6:
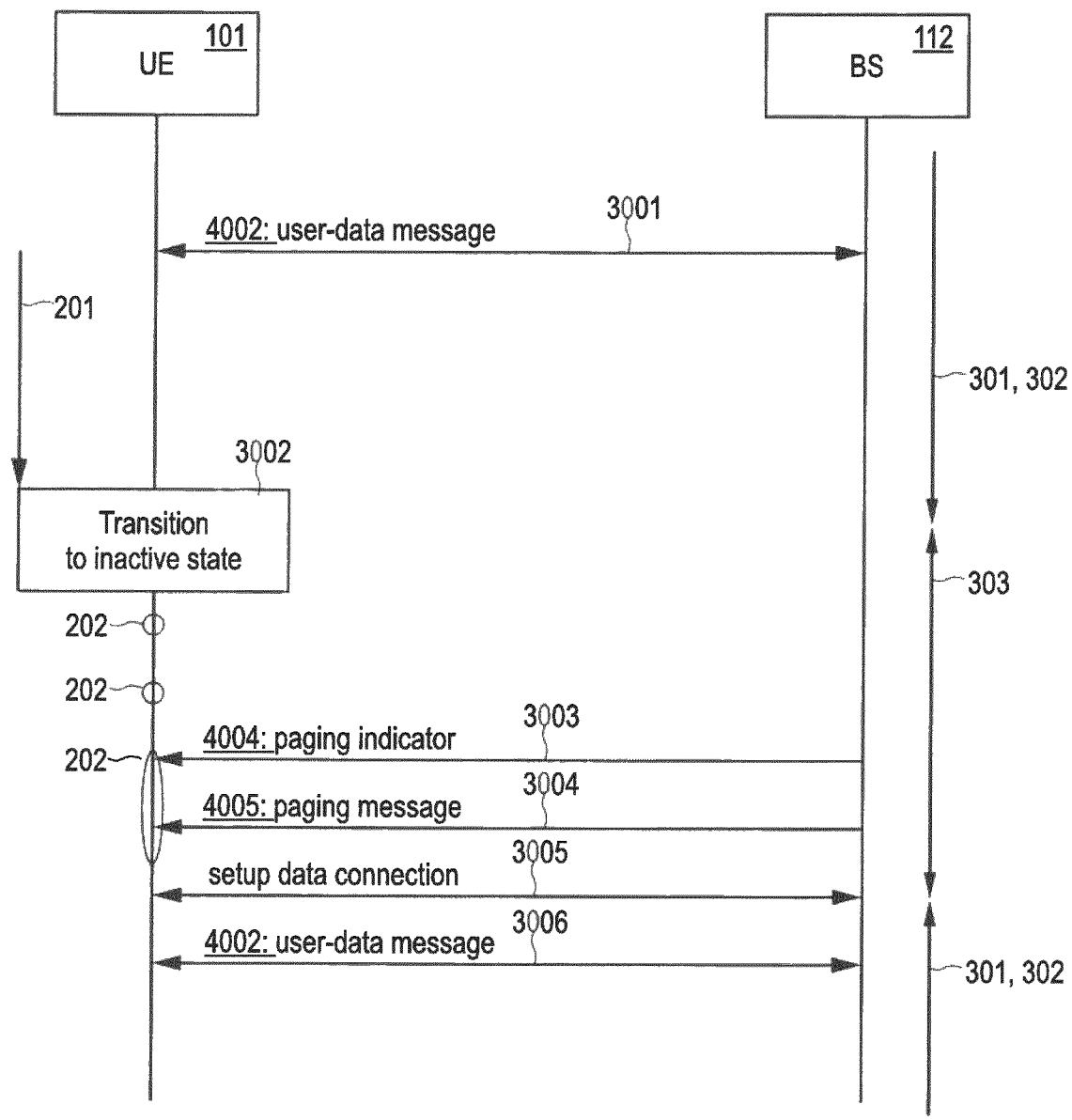
FIG. 6 is a signaling diagram illustrating paging of a UE according to various examples.

FIG. 6 is a signaling diagram. FIG. 6 illustrates aspects with respect to communicating between the UE 101 and the BS 112. FIG. 6 illustrates aspects with respect to transmitting and/or receiving (communicating) paging signals 4004, 4005.

At 3001—generally an optional block—, a user-data message 4002 is communicated. For example, the user-data message 4002 may be communicated along the data connection 189, e.g., as part of a bearer, etc. The user-data message 4002 includes application data.

Then, there is no more data to be communicated between the UE 101 and the BS 112. Transmit buffers are empty. This may trigger a timer. For example, the timer may be implemented at the UE 101. After a certain timeout duration set in accordance with the inactivity schedule 201, the receiver of the UE 101 is transitioned into the inactive state 384 from the active state 381, at 3002. This is done in order to reduce the power consumption of the UE 101. For example, prior to the transitioning the main receiver 1351 to the inactive state 384, it would be possible to release the data connection 189 by appropriate control signaling (not illustrated in FIG. 6). The timeout duration 201 is an example implementation of a trigger criterion for transitioning into the inactive state 384; other trigger criteria are possible. For example, a connection release message may be communicated.

This corresponds to a transition into the idle mode 303 (cf. FIG. 4).

Multiple POs 202 are then implemented. The POs 202 may be in accordance with the ON durations 371 of the DRX cycle 370.

At some point in time, the BS 112 transmits a paging indicator 4004. The UE 101 receives the paging indicator 4004, at 3003. For example, the paging indicator 4004 may include a temporary or static identity of the UE 101. The paging indicator or may be indicative of a plurality of UEs, because the indicator may be derived from unique identities of the UEs such as the International Mobile Subscriber Identity (IMSI) or the like in an ambiguous manner. The paging indicator 4004 may include information on a modulation and coding scheme (MCS) used for communicating a paging message 4005 at 3004. The paging message 4005 may be communicated on a shared channel, e.g., physical downlink shared channel (PDSCH). The paging message may include RRC control data. Generally, the paging indicator 4004 and the paging message 4005 may be communicated on different channels. The paging message 4005 may be modulated and encoded according to the MCS indicated by the paging indicator 4004. Thus, it may be required that the UE 101 receives, firstly, the paging indicator 4004 and, secondly, the paging message 4005. It is not mandatory that the paging indicator 4004 and the paging message 4005 are received in the same PO.

Then, at 3005, a data connection 189 is set up between the UE 101 and the BS 112. This may include a RA procedure and an RRC set up.

Finally, a UL or DL user-data message 4002—e.g., including payload data—is communicated using the newly set up data connection 189 at 3006.

In FIG. 6, the UE 101 activates its receiver in order to prepare for paging reception in a PO 202. For this, the UE 101 typically requires to first identify a SS transmission. In FIG. 6, the SS burst transmission is not illustrated for sake of simplicity. In 3GPP NR, the SSs are included into a SS burst. For example, a SS block may include primary SSs (PSSs) and secondary SSs (SSSs) as well as broadcast channel (PBCH). There may be several consecutive repetitions of the SS block in a given SS burst. The SS burst may be defined with a certain time window, e.g., a 5 ms time window. The maximum transmission bandwidths of each SS block may be [5 10 40 80] MHz with [15 30 120 240] KHz subcarrier spacing respectively. And SS burst set periodicity is configurable from the set of {5, 10, 20, 40, 80, 160} ms.

The scenario of FIG. 6 may be combined with communication on an open spectrum. This is illustrated in FIG. 7.

Figure 7:
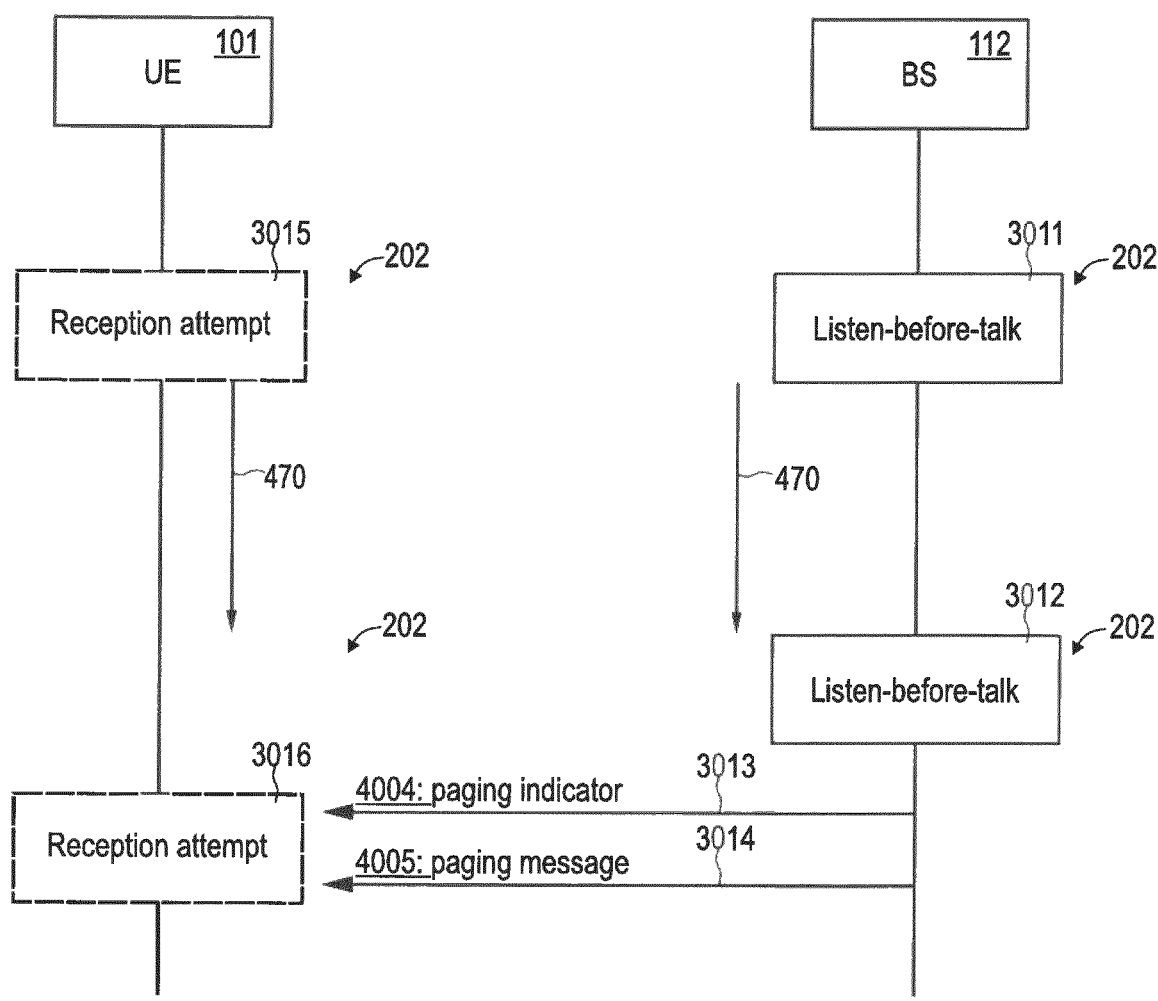
FIG. 7 illustrates details of the paging of FIG. 6 for communication on an open spectrum according to various examples.

FIG. 7 is a signaling diagram. FIG. 7 illustrates aspects with respect to communicating between the UE 101 and the BS 112. FIG. 7 illustrates aspects with respect to transmitting and/or receiving (communicating) paging signals 4004, 4005.

FIG. 7 specifically illustrates aspects of accessing an open spectrum for paging. For example, the technique of FIG. 7 may be employed in connection with the communication of the paging signals 4004, 4005 at 3003, 3004 of FIG. 6.

At 3011—time-aligned with a PO 202—, the BS 112 implements an LBT procedure. In other words, the BS 112 attempts to access the open spectrum. Hence, a signal level may be sensed on the open spectrum. For example, if the signal level exceeds a threshold, a backoff 470 may be implemented. In the scenario of FIG. 7, the LBT procedure at 3011 is implemented in accordance with the timing schedule 375 of a DRX cycle 370 implemented by the UE 101. The LBT procedure includes the BS 112 implementing a transmission attempt at a PO 202 coincident with an ON duration 371 of the DRX cycle 370.

As illustrated in FIG. 7, the transmission attempt fails and the backoff 470 is activated. Then, at 3012—at a next PO 202 or still within the same PO 202—a further LBT procedure is implemented. At 3012, the transmission attempt succeeds and therefore the BS 112, at 3013, 3014, transmits the paging signals 4004, 4005.

Illustrated in FIG. 7 are further aspects with respect to the behavior of the UE 101. In the scenario of FIG. 7, the UE 101, in accordance with the timing schedule 375 of the DRX cycle 370, implements reception attempts at 3015 and 3016. The reception attempt at 3015 fails, because of the failed transmission attempt at 3011. The reception attempt at 3016 succeeds.

Hereinafter, techniques are described which facilitate discriminating between scenarios in which paging signals 4004, 4005 are not received in a reception attempt due to (I) the network not paging the UE 101 and hence not even attempting to transmit paging signals 4004, 4005; and (II) the network attempting to transmit paging signals 4004, 4005, but being unable to do so due to a failed transmission attempt. This facilitates a tailored backup procedure at the UE 101. Energy consumption can be lowered by avoiding ambiguities.

Further, hereinafter, techniques are described which facilitate completion of the paging of the UE 101 within a MCOT of the open spectrum.

Strategies which enable such effects are illustrated in connection with FIG. 8.

Figure 8:
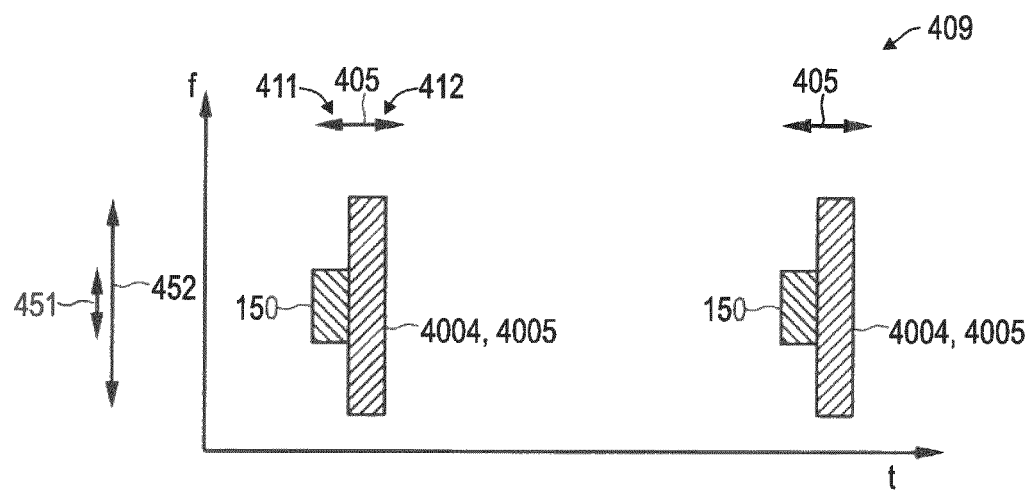
FIG. 8 schematically illustrates allocation of time-frequency resources for SS bursts and paging signals according to various examples.

FIG. 8 illustrates this allocation of time-frequency resources for paging. In FIG. 8, allocation of time-frequency resources to SS bursts 150 and paging signals 4004, 4005 are illustrated. The time-frequency resources reside on an open spectrum 409.

Time-frequency resources can be defined by an orthogonal frequency division multiplexing (OFDM) modulation including symbols and subcarriers. The atomic element encoding information is associated with a respective time-frequency resource element.

As illustrated in FIG. 8, an SSs burst 150—including multiple SSs 159—is communicated on an open spectrum from the BS 112 to the UE 101. Also, paging signals 4004, 4005 are communicated on the open spectrum from the BS 112 to the UE 101. As illustrated in FIG. 8, the SS burst 150, as well as the paging signals 4004, 4005 are communicated in a common MCOT 405. The time-frequency resources are respectively allocated. Therefore, if a transmission attempt of a LBT procedure succeeds, it is possible to communicate all signals 150, 4004, 4005 within the single MCOT 405. Since only a single MCOT is required, the chance of quickly completing the paging increases, if compared to scenarios where due to unfavorable allocation of the time-frequency resources multiple MCOTs are required.

Figure 9:
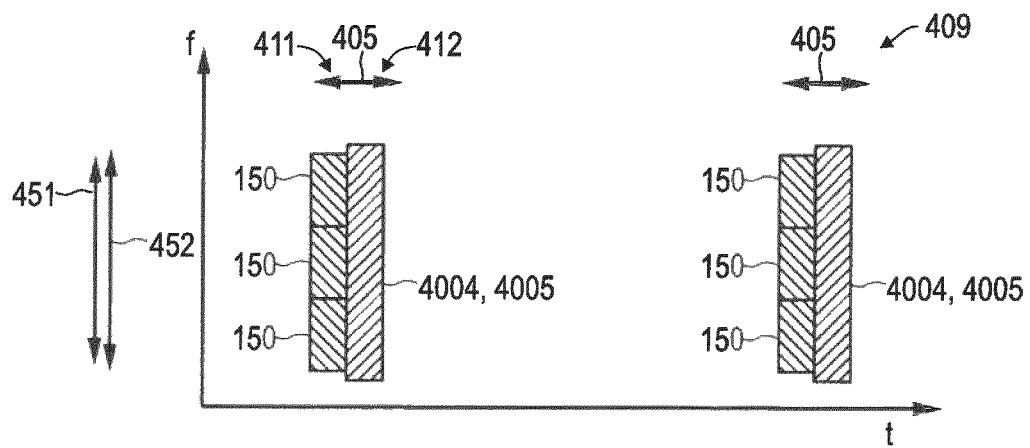
FIG. 9 schematically illustrates allocation of time-frequency resources for SS bursts and paging signals according to various examples.

FIG. 9 illustrates the allocation of time-frequency resources for paging. FIG. 9 generally corresponds to FIG. 8.

In the scenario FIG. 9, multiple SS bursts 150 are communicated using frequency division multiplexing. Thereby, frequency diversity can be facilitated for the synchronization of the UE 101 with the BS 112. This generally increases a likelihood of successful reception of the paging signals 4004, 4005.

Alternatively or additionally to such a frequency division multiplexing approach, multiple SS bursts 150 may also be communicated using time division multiplexing, if the length of the MCOT 405 permits.

For example, the duration of the MCOT 405 may be determined, e.g., from the regulatory requirements of the open spectrum. Then, a frequency-reuse factor of the frequency division multiplexing can be selected based on such determining of the duration of the MCOT 405.

In the scenario FIGS. 8 and 9, the at least one SS burst 150 is communicated in a first part 411 of the MCOT 405. The paging signals 4004, 4005 are communicated in a second part 412 of the MCOT 405, arranged after the first part 411. The at least one SS burst 150 is communicated using a bandwidth 451 and the paging signals 4004, 4005 are communicated using a bandwidth 452. Generally, the bandwidth 451 can be different from the bandwidth 452. Since typically more information is to be conveyed in the paging signals 4004, 4005, there may be a tendency that the bandwidth 452 is larger than the bandwidth 451; however, depending on the frequency reuse factor of the frequency division multiplexing used for transmission of multiple SS bursts 150 (as illustrated in FIG. 9), this difference may disappear or may be small. This helps to avoid asymmetries in the allocation of resources between the first and second parts 411, 412; which can help to efficiently occupy the open spectrum.

Further, to limit control signaling overhead arising from communicating multiple SS bursts, e.g., using frequency division multiplexing, adaptation of the bandwidth allocated for communication of the SS bursts can be employed. Such a scenario is illustrated in FIG. 10.

Figure 10:
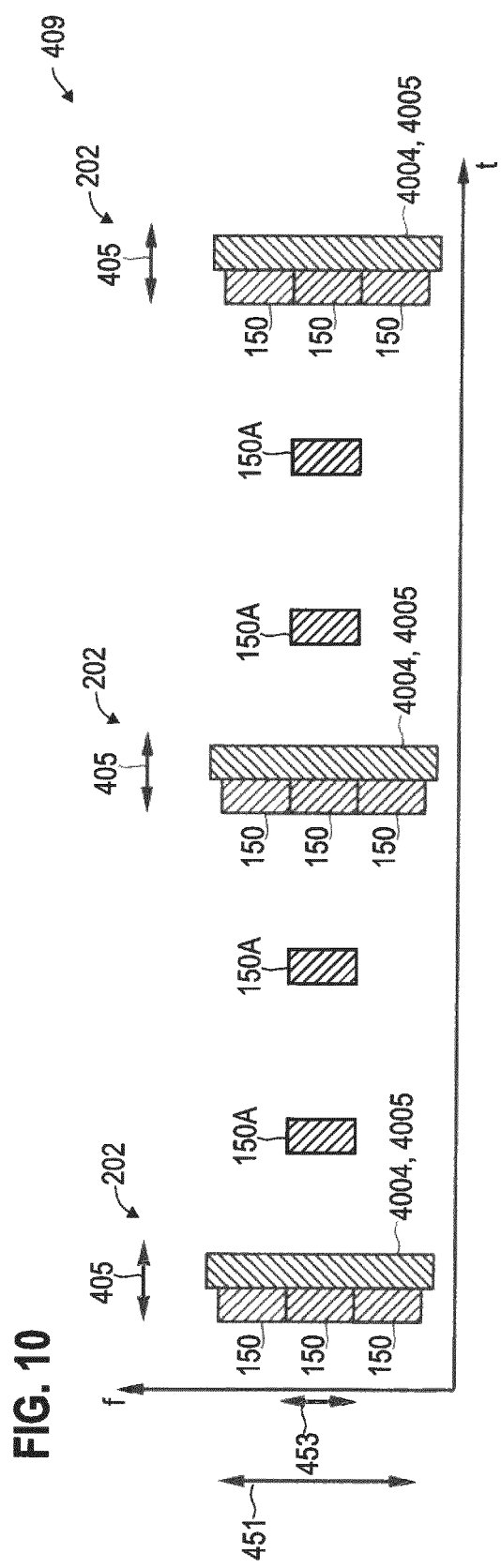
FIG. 10 schematically illustrates allocation of time-frequency resources for SS bursts and paging signals according to various examples.

FIG. 10 illustrates the allocation of time-frequency resources for paging and synchronization. In the scenario FIG. 10, the SS bursts 150 and the paging signals 4004, 4005 are communicated in accordance with the timing schedule 375 of the DRX cycle 370 of the UE 101, i.e., at the POs 202.

In the scenario FIG. 10, the bandwidth 451 for communication of the SS bursts 150 at the POs 202, i.e., in accordance with the timing schedule 375 of the discontinuous reception cycle 370, is implemented as in FIG. 9. However, further SS bursts 150A using a smaller bandwidth 453 are communicated in between the POs 202. For example, the SSs 159 included in the SS bursts 150 can be the same or correspond to the SSs 159 included in the SS bursts 150A. As illustrated in FIG. 10, a repetition rate of the SS bursts 150A can be larger than a repetition rate of the communication signal bursts 150.

The approach of FIG. 10 limits control signaling overhead; while, at the same time, facilitating low-latency paging.

In the scenarios of FIGS. 8-10, the paging signals communicated in the MCOT 405 include, both, the paging indicator 4004 and the paging message 4005 (cf. FIG. 6 and FIG. 7). The paging message 4005 is transmitted after the paging indicator 4004. Generally, low-latency paging can already be facilitated if only the paging indicator 4004 is communicated in a common MCOT 405 together with the at least one SS burst 150. Then, it is possible that two LBT procedures are required which, however, compared to reference implementation still reduces the required time until completion of paging.

If multiple paging signals 4004, 4005 are included in an MCOT 405, then they may be communicated using at least one of frequency division multiplexing and time division multiplexing, e.g., depending on the duration of the MCOT 405.

Furthermore, as illustrated in FIGS. 8-10, the at least one SS burst 150 and the one or more paging signals 4004, 4005 are communicated in adjacent time-frequency resources.

Therefore, the spectrum utilization can be high; this facilitates completion of the paging within one or only a few MCOTs 405. There may be no symbols arranged in between the at least one SS burst 150 and the one or more paging signals 4004, 4005 in case of adjacent time-frequency resources.

Figure 11:
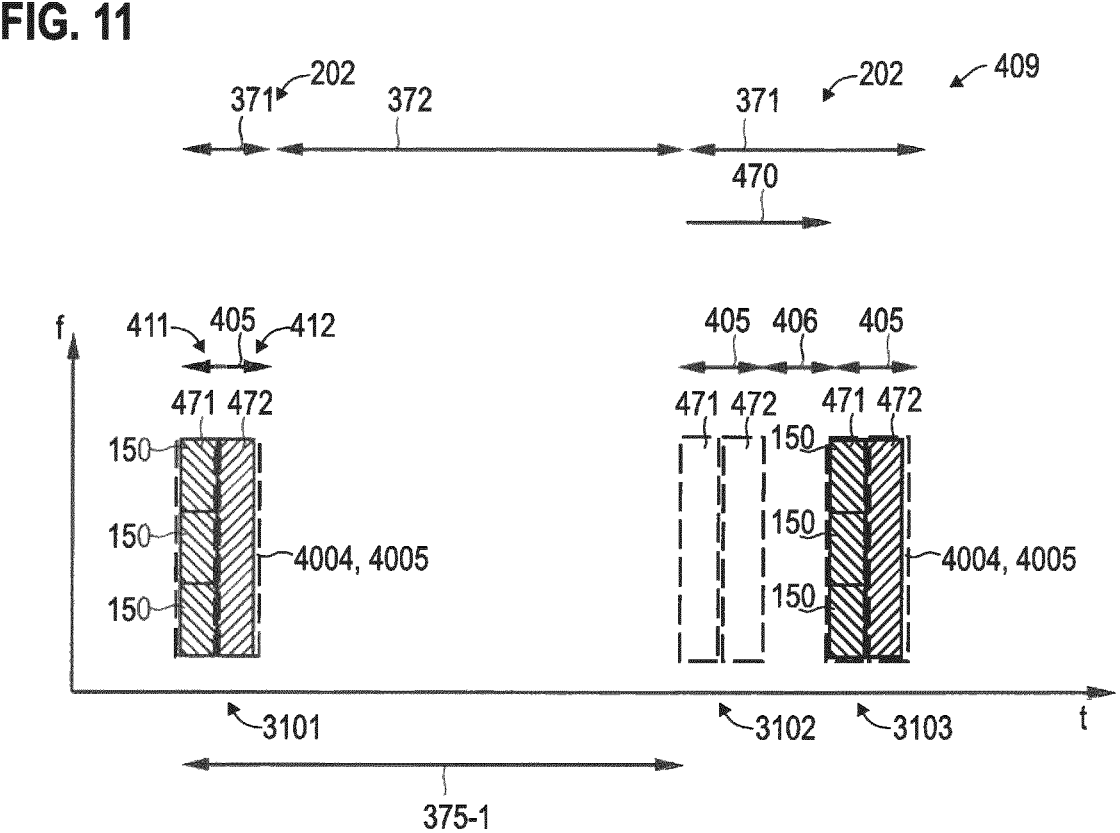
FIG. 11 schematically illustrates reception attempts of the UE according to various examples.

FIG. 11 illustrates the allocation of time-frequency resources for paging and synchronization. In the scenario FIG. 11, the SS bursts 150 and the paging signals 4004, 4005 are communicated in accordance with the timing schedule 375-1 of the DRX cycle 370 of the UE 101, i.e., at the POs 202.

FIG. 11 illustrates aspects with respect to the UE behavior. In detail, at 3101, the UE implements a reception attempt 471 of at least one SS burst 150 and further implements a reception attempt 472 of the at least one paging signal 4004, 4005. Here, the reception attempt 471 is time aligned with the first part 411 of a MCOT 405 while the reception attempt 472 is time aligned with the second part 412 of the MCOT 405.

Based on a result of the reception attempt 471 and, optionally, based on a result of the reception attempt 472, a backoff 470 is activated or not activated (selectively activated). The backoff 470 enables further reception attempts 471, 472 after the backoff time duration. By considering the result of the reception attempt 471, reliable discrimination between a failed transmission attempt of the LBT procedure at the BS 112 on the one hand side, and lack of network paging on the other hand side is possible.

In the example of FIG. 11, both reception attempts 471 and 472, at 3101, have a positive result, i.e., the UE 101 is able to receive the at least one SS burst 150 and the at least one paging signal 4004, 4005. This implies that a corresponding transmission attempt of the LBT procedure at the BS 112 also had a positive result. Based on the result of the reception attempt 471 and the result of the reception attempt 472, the OFF duration 372 is then activated. In detail, at 3101, the paging is not for the UE 101, but rather for another UE. Therefore, the UE 101 does not transition to the connected mode 301, 302, but rather activates the OFF duration 372 of the DRX cycle 370. The UE 101 continues to operate in the disconnected mode 303, because it is not paged.

At the next PO 202, at 3102, the UE 101 again implements reception attempt 471, 472. Both, the reception attempt 471 and the reception attempt 472 fail, i.e., respective results are negative. Failure of the reception attempt 471 triggers activation of the backoff 470 (cf. FIG. 7). This is motivated by the finding that—even in absence of any network paging—a positive result of a transmission attempt by the BS 112 would result in transmission of the at least one SS burst 150. However, since also the reception attempt 471 targeted at this at least one SS burst 150 fails, it can be concluded that the BS 112 implemented a backoff 470 due to a failed transmission attempt.

After the backoff 470, the UE 101, at 3103 again implements reception attempts 471, 472, this time with positive result. At 3103, the at least one paging signal 4004, 4005 indicates paging of the UE 101 which, subsequently, transitions into the connected mode 301, 302 (not illustrated in FIG. 11).

In the scenario of FIG. 11, the backoff 470 includes activating a backoff timer. 3102 and 3103 are part of the same PO 202. Specifically, between the reception attempts 471, 472 at 3102 and the reception attempts 471, 472 at 3103, the receiver of the UE 101 continuously operates in the active state 382. The backoff timer, in other words, is dimensioned shorter than the ON durations 371. This is possible because the time duration 406 between adjacent MCOTs 405—typically also defined by regulatory requirements of the open spectrum 409—is shorter than the ON durations 371. In such a scenario, it is not required to modify the timing schedule 375-1 of the DRX cycle 370. In other examples, modification of the timing schedule of the DRX cycle 370 may be preferred. Such a scenario is illustrated in connection with FIG. 12.

Figure 12:
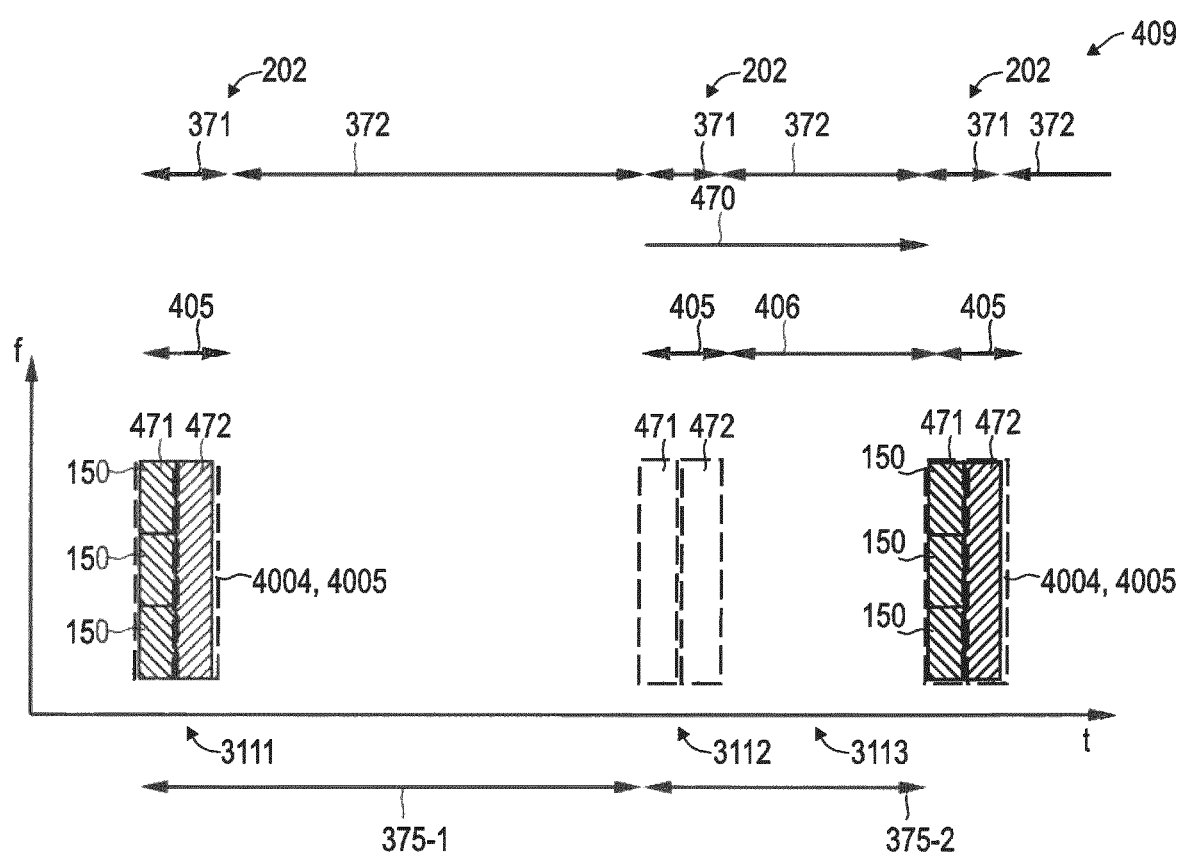
FIG. 12 schematically illustrates reception attempts of the UE according to various examples.

FIG. 12 illustrates the allocation of time-frequency resources for paging and synchronization, the time-frequency resources residing on the open spectrum 409. In the scenario FIG. 12, the SS bursts 150 and the paging signals 4004, 4005 are communicated in accordance with the timing schedule 375-1 of the DRX cycle 370 of the UE 101, i.e., at the POs 202.

FIG. 12 illustrates aspects with respect to the UE behavior. The scenario FIG. 12 generally corresponds to the scenario FIG. 11. However, in the scenario FIG. 12, the timing schedule 375-1 of the DRX cycle 370 is modified to obtain the timing schedule 375-2. Hence, in response to the failed reception attempt 471 at 3112, the timing schedule 375-2 is activated and the timing schedule 375-1 is deactivated. The timing schedule 375-2 includes a shorter OFF durations 372 if compared to the timing schedule 375-1.

For example, the OFF duration 372 of the timing schedule 375-1 can correspond to an integral multiple of the OFF duration 372 of the timing schedule 375-2. For example, the timing schedule 375-1 may be in accordance with a so-called enhanced DRX cycle that facilitates reduced power consumption by prolonging the off duration 372 if compared to the (non-enhanced) DRX cycle.

As illustrated in FIG. 12, in response to the failed reception attempts 471, 472 at 3112, the OFF duration 372 is activated, i.e., the receiver of the UE 101 transitions to the inactive state 384 (cf. FIG. 5). Because, both, the reception attempt 471, as well as the reception attempt 472 fail, it can be concluded that the transmission attempt at the BS 112 failed.

Figure 13:
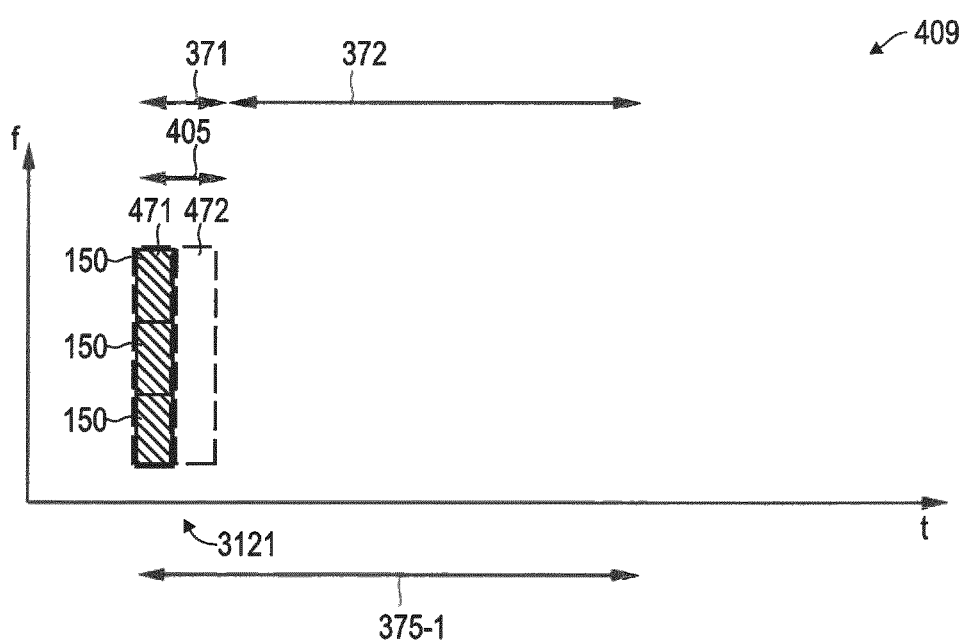
FIG. 13 schematically illustrates reception attempts of the UE according to various examples.

FIG. 13 illustrates the allocation of time-frequency resources for paging and synchronization, the time-frequency resources residing on the open spectrum 409. In the scenario FIG. 13, the SS bursts 150 and the paging signals 4004, 4005 are communicated in accordance with the timing schedule 375-1 of the DRX cycle 370 of the UE 101, i.e., at the POs 202.

FIG. 13 illustrates aspects with respect to the UE behavior. The scenario FIG. 13 generally corresponds to the scenario of FIG. 12. In the scenario FIG. 13, at 3121, the reception attempt 471 succeeds, but the reception attempt 472 fails. This is due to lack of network paging. However, since the at least one SS burst 150 can be received as part of the reception attempt 471, the UE 101 can conclude that the transmission attempt by the BS 112 also succeeded. Then, the OFF duration 372 of the timing schedule 375 can be activated, because the reception attempt 471 succeeds and the reception attempt 472 fails.

Figure 14:
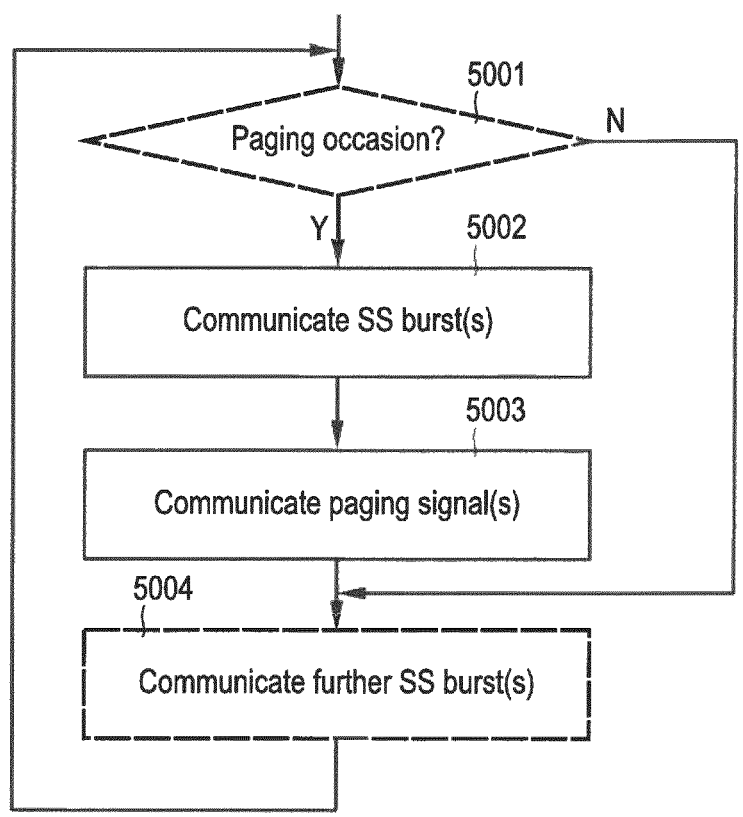
FIG. 14 is a flowchart of a method according to various examples.

FIG. 14 is a flowchart of a method according to various examples. For example, the method of FIG. 14 could be implemented by the control circuitry 1121, 1125 of the BS 112. Alternatively or additionally, the method of FIG. 14 could be implemented by the control circuitry 1011, 1015 of the UE 101.

At optional block 5001, it is checked whether a PO is present. The PO may be coincident with the ON duration of a timing schedule of a DRX cycle of a UE (cf. FIGS. 5, 6, and 10).

When a PO occurs, the method commences with block 5002. At block 5002, at least one SS burst is communicated. For example, multiple SS bursts may be communicated using at least one frequency division multiplexing and time division multiplexing. At block 5002, the BS may transmit the at least one SS burst and/or the UE may receive the at least one SS burst.

Next, at block 5003, at least one paging signal is communicated. For example, a paging indicator and/or a paging message may be communicated (cf. FIGS. 6 and 7). At block 5003, the BS may transmit the at least one paging signal and/or the UE may receive the at least one paging signal.

Blocks 5002 and 5003 may include a transmission attempt of the BS and a reception attempt of the UE.

The blocks 5002, 5003 may be executed within a common MCOT of an open spectrum. Hence, the at least one SS burst of block 5002 and the at least one paging signal of block 5003 may be concatenated into a common MCOT (cf. FIGS. 8 and 9).

At optional block 5004, at least one further SS burst is communicated. The at least one further SS burst of block 5004 is communicated time offset from any PO. As such, the at least one further SS burst of block 5004 is also communicated if, at block 5001, it is judged that a PO is not present. For example, the at least one further SS burst of block 5004 and the at least one SS burst of block 5002 may allocate different bandwidths on the open spectrum (cf FIG. 10).

Figure 15:
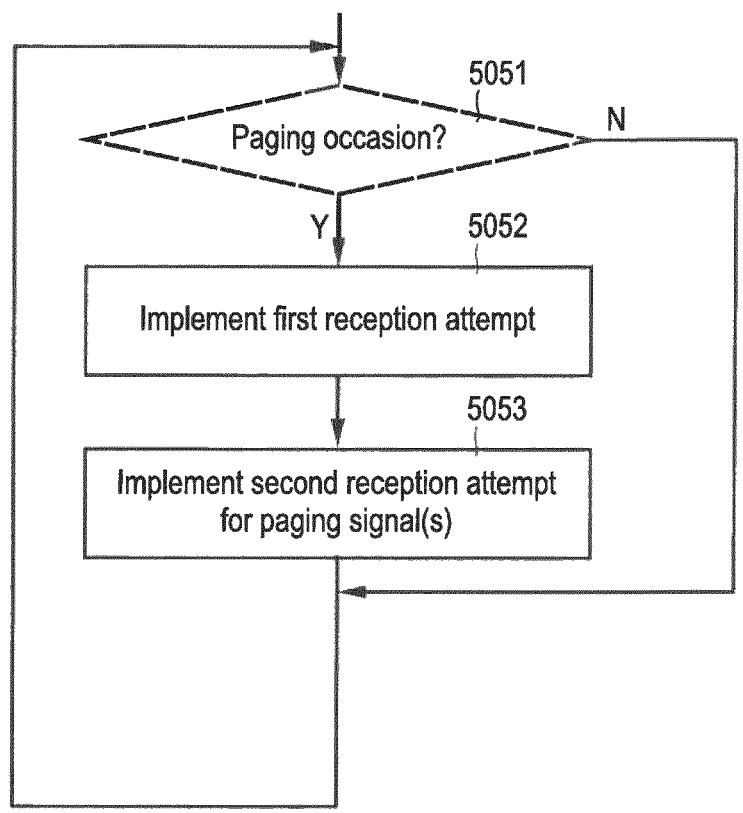
FIG. 15 is a flowchart of a method according to various examples.

FIG. 15 is a flowchart of a method according to various examples. For example, the method of FIG. 15 could be implemented by the control circuitry 1011, 1015 of the UE 101.

The method of FIG. 15 can be inter-related with the method of FIG. 14.

Block 5051 corresponds to block 5001 of FIG. 14.

Block 5052 corresponds to block 5002 of FIG. 14. At block 5052, a first reception attempt is implemented—if, at block 5051 it is judged that a PO is present. Implementing a reception attempt can include listening for one or more reference signals on the open spectrum.

Block 5053 corresponds to block 5003. At block 5053, a second reception attempt for at least one paging signal is implemented.

In the scenario of FIG. 15, if no PO is present, then no reception attempts are implemented. For example, a corresponding receiver may then operate in an inactive state (cf. FIG. 5).

By implementing the first and second reception attempts in blocks 5052, 5053, it can be discriminated between failed transmission attempts on the one hand side and lack of paging by the network. Such a scenario is illustrated in greater detail in FIG. 16.

Figure 16:
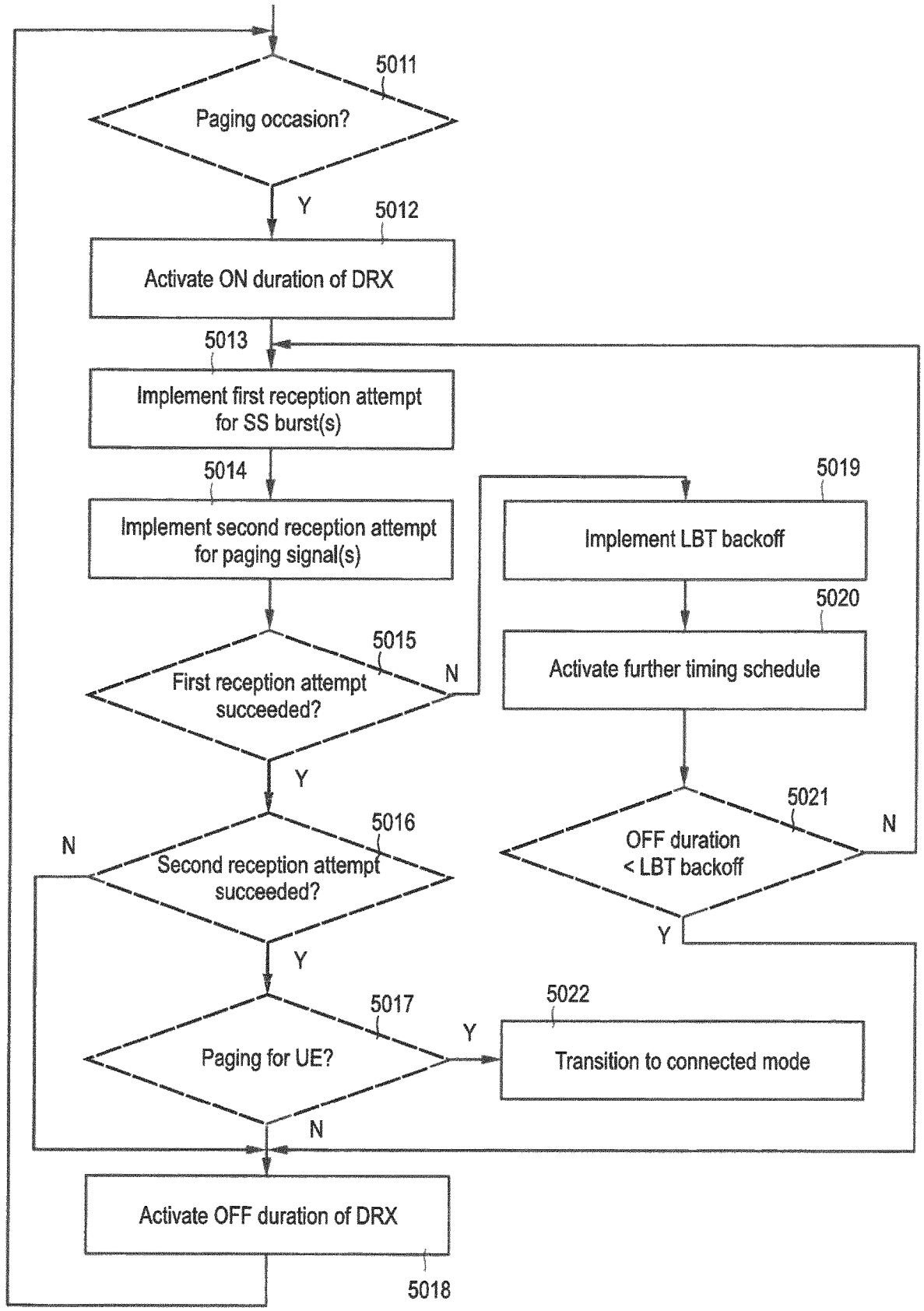
FIG. 16 is a flowchart of a method according to various examples.

FIG. 16 is a flowchart of a method according to various examples. For example, the method of FIG. 16 could be implemented by the control circuitry 1011, 1015 of the UE 101.

Block 5011 corresponds to block 5001 of FIG. 14.

If, at block 5011, it is judged that the PO is present, then, at block 5012, the ON duration of a timing schedule of a DRX cycle is activated. This can include operating a receiver of the UE in an active state (cf. FIG. 5) in which it is fit to receive paging signals.

Block 5013 corresponds to block 5052 of FIG. 15, here implemented by a reception attempt for one or more SS bursts.

Block 5014 corresponds to block 5053 of FIG. 15.

At block 5015 it is judged whether the first reception attempt has a positive result. For example, it can be checked whether at least one SS burst has been received at block 5013. If, at block 5015, it is judged that the first reception attempt succeeded, then block 5016 is executed.

At block 5016, it is judged whether the second reception attempt has succeeded. For example, it can be checked whether at least one paging signal has been received at block 5014.

If, at block 5016, it is judged that the second reception attempt of block 5014 has a positive result, then, at block 5017, it is checked whether the paging is for the UE. For example one or more UE identities included in a corresponding paging signal can be compared with a UE identity of the subject UE.

If, at block 5017, it is judged that the network attempts to page the UE, then block 5022 is executed. At block 5022, a transition into a connected mode is implemented (cf. FIG. 4), e.g., by means of the RA procedure.

If, at block 5017, it is judged that the network does not attempt to page the UE, then, at block 5018, the OFF duration of the DRX cycle is activated. This can correspond to operating a receiver of the UE in an inactive state (cf. FIG. 5). Likewise, if, at block 5016, it is judged that the second reception attempt has not succeeded, then block 5018 is executed—because the network does not page any UE.

If, at block 5015, it is judged that the first reception attempt has not been successful, then a backoff is activated at block 5019. At block 5019, the backoff is implemented (sometimes also referred to as LBT backoff). As a general rule, different strategies for implementing the backoff are available. One strategy includes activating a backoff timer. A further strategy, as illustrated in FIG. 16, includes activating a further timing schedule of the DRX cycle, at block 5020. At block 5021, it is checked whether the OFF duration of the now activated further timing schedule of the DRX cycle is shorter than the backoff. In the affirmative, the OFF duration of the now activated further timing schedule is activated in block 5018; otherwise, a backoff timer may be activated without activating the OFF duration of the DRX cycle; then, block 5013 can be re-executed within the same PO.

Summarizing, techniques have been described which limit the impact of LBT for open spectrum communication on paging. In some examples, concatenation of one or more SS bursts and one or more paging signals into a MCOT of the open spectrum is possible. In further examples, alternatively or additionally, a network node may conclude via an LBT procedure that it is currently not able to communicate with the intended receiver at the intended time. This is referred to as LBT failure. Then a backup procedure can be triggered.

Various techniques described herein are based on the finding that SS design for operation on the unlicensed spectrum can be in accordance with standalone or based on operation of 3GPP NR on the licensed band. However, due to some spectrum characteristics and regulatory requirements, e.g., uncertainty of channel availability due to LBT, certain aspects are to be considered further. In terms of access regulations, the transmission bandwidth of, e.g., SS blocks and RA signals may in many cases be narrower than the nominal channel bandwidth on unlicensed band. Hence, the design or allocation of transmissions in frequency domain can be tailored to this end.

In terms of channel access it can be useful to reduce the LBT overhead from the control signaling. This can be achieved by the transmission of control signals for initial access (network access signals) such as SS, RA preamble, and RA Msg2/3/4 in a consecutive manner, utilizing the MCOT.

Various techniques are based on the finding that the NR control signal design for licensed bands may need to be revised when applied to open spectrum due to various channel access requirements.

Some of the techniques described herein relate to the control signaling design such as SS burst transmissions for transmission on the open spectrum, taking channel contention and channel occupancy time into account. Multiplexing the SS bursts with other transmissions such as application data, e.g., on PDSCH, or network access signals could be relevant for signaling bandwidth aspects and to achieve a reduced LBT overhead. Also, reducing the number of RA steps (e.g. 2-step RA procedure) or guarantee for transmission related to RA procedure can help to reduce the occurrence of RA failure due to LBT failure.

The techniques described herein tailor control signaling design for transmission on an open spectrum with respect to channel access regulation aspects.

Summarizing, the following examples have been described:

Example 1

A method of operating a base station (112), comprising:
transmitting, to a terminal (101), at least one synchronization signal burst (150) in a time-limited channel access interval (405) of an open spectrum (409), and
transmitting, to the terminal (101), at least one paging signal (4004, 4005) in the channel access interval (405) of the open spectrum (409).

Example 2

A method of operating a terminal (101), comprising:
implementing a first reception attempt (471) for at least one synchronization signal burst (150) on an open spectrum (409), and
implementing a second reception attempt (472) for at least one paging signal (4004, 4005) on the open spectrum (409),
wherein the first reception attempt (471) and the second reception attempt are implemented in a common, time-limited channel access interval (405) of the open spectrum (409).

Example 3

The method of example 2, further comprising:
depending on a first result of the first reception attempt (471): selectively activating a backoff (470) for a further first reception attempt (471) for the at least one synchronization signal burst (150) and a further second reception attempt (472) for the at least one paging signal (4004, 4005),

Example 4

The method of example 3,
wherein the backoff (470) is activated if the first reception attempt (471) fails,
wherein the backoff (470) is not activated if the first reception attempt (471) succeeds.

Example 5

The method of examples 3 or 4,
wherein the first reception attempt (471) and the second reception attempt (472) are implemented in accordance with a timing schedule (375, 375-1) of a discontinuous reception cycle (370) of the terminal (101),
wherein the method further comprises:
depending on the first result and depending on the second result: selectively activating an OFF duration (372) of the discontinuous reception cycle (370).

Example 6

The method of example 5,
wherein the OFF duration (372) is activated at least if the first reception attempt (471) succeeds and the second reception attempt fails.

Example 7

The method of any one of examples 3-6,
wherein the backoff (470) includes activating a backoff timer.

Example 8

The method of any one of examples 3-7,
wherein the first reception attempt (471) and the second reception attempt (472) are implemented in accordance with a timing schedule (375, 375-1) of a discontinuous reception cycle (370) of the terminal (101):
wherein the backoff (470) includes activating a further timing schedule (375-2) of the discontinuous reception cycle (370) which comprises a shorter OFF duration (372) if compared to the timing schedule (375, 375-1).

Example 9

The method of any one of the preceding examples,
wherein the at least one synchronization signal burst (150) comprises multiple synchronization signal bursts,
wherein the multiple synchronization signal bursts (150) are transmitted using frequency division multiplexing.

Example 10

The method of example 9, further comprising:
determining a duration of the channel access interval (405), and
based on said determining of the duration of the channel access interval (405), selecting a frequency-reuse factor of the frequency division multiplexing.

Example 11

The method of any one of the preceding examples,
wherein the at least one synchronization signal burst (150) is transmitted in a first part (411) of the channel access interval (405) using a first bandwidth (451) of the open spectrum (409),
wherein the at least one paging signal (4004, 4005) is transmitted in a second part (412) of the cannel access interval (405) using a second bandwidth (452) of the open spectrum (409) which is different from the first bandwidth (451),
wherein the second part (412) is transmitted after the first part (411).

Example 12

The method of any one of the preceding examples,
wherein the at least one synchronization signal burst (150) is transmitted using a first bandwidth (451) of the open spectrum (409),
wherein the method further comprises:
transmitting, to the terminal (101), at least one further synchronization signal burst (150A) using a further bandwidth (453) of the open spectrum (409),
wherein the further bandwidth (453) is smaller than the first bandwidth (451).

Example 13

The method of any one of the preceding examples,
wherein the at least one paging signal (4004, 4005) comprises multiple paging signals (4004, 4005),
wherein the multiple paging signals (4004, 4005) are transmitted using at least one of frequency division multiplexing and time division multiplexing.

Example 14

The method of any one of the preceding examples,
wherein the at least one paging signal (4004, 4005) comprises a paging indicator (4004), and
wherein the at least one paging signal (4004, 4005) optionally comprises a paging message (4005) associated with the paging indicator (4004) and transmitted after the paging indicator (4004).

Example 15

The method of any one of the preceding examples,
wherein the at least one synchronization signal burst (150) and the at least one paging signal (4004, 4005) are transmitted in accordance with a timing schedule (375, 375-1) of a discontinuous reception cycle (370) of the terminal (101).

Example 16

The method of any one of the preceding examples,
wherein the at least one synchronization signal burst (150) and the at least one paging signal (4004, 4005) are transmitted in adjacent time-frequency resources.

Example 17

A base station (112) comprising control circuitry (1121, 1125) configured to:
transmit, to a terminal (101), at least one synchronization signal burst (150) in a time-limited channel access interval (405) of an open spectrum (409), and
transmit, to the terminal (101), at least one paging signal (4004, 4005) in the channel access interval (405) of the open spectrum (409).

Example 18

The base station (112) of example 17,
wherein the control circuitry is configured to perform the method of any one of examples 1 and 9-16.

Example 19

A terminal (101) comprising control circuitry (1011, 1015) configured to:
implement a first reception attempt (471) for at least one synchronization signal burst (150) on an open spectrum (409), and
implement a second reception attempt (472) for at least one paging signal (4004, 4005) on the open spectrum (409),
wherein the first reception attempt (471) and the second reception attempt are implemented in a common, time-limited channel access interval (405) of the open spectrum (409).

Example 20

The terminal (101) of example 19,
wherein the control circuitry (1011, 1015) is configured to perform the method of any one of examples 2-16.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various scenarios have been described in which one or more SS bursts and one or more paging signals are concatenated into a common MCOT of an open spectrum. In some scenarios, it may be sufficient to receive a single SS for time-synchronization between UE and BS. In such scenarios, the techniques may be modified to concatenate one or more SS signals and one or more paging signals into a common MCOT.

For further illustration, it would be generally possible to concatenate one or more paging signals and one or more reference signals transmitted by the BS into a common MCOT of an open spectrum. While SS or SS bursts are one possible implementations of the one more reference signals, in other implementations other kinds and types of reference signals may be used. While some reference signals may not be suited for time synchronization, they may still enable the UE to discriminate between lack of paging, and a failed transmission attempt by the BS.

For still further illustration, while various techniques have been described with respect to concatenating one or more paging signals and one or more SS bursts into a common MCOT, similar techniques may be readily applied to concatenating other kinds and types of signals into a common MCOT. For example, it would be possible to concatenate one or more SS bursts and one or more network access signals into a common MCOT. For example, the one more network access signals may include a RA preamble or a RA message 2. In some examples, it would even be possible to concatenate one or more SS bursts and one or more application data messages into a common MCOT. Such techniques are based on the finding that by concatenating one or more signals into a common MCOT, the overall likelihood of multiple transmission attempts due to LBT failure is reduced.

For further illustration, above, various scenarios have been described for a 3GPP NR 5G network. Similar techniques may be readily applied for other kinds and types of networks.

The invention claimed is:

1. A method of operating a terminal, comprising:
   implementing a first reception attempt for at least one synchronization signal burst on an open spectrum,
   implementing a second reception attempt for at least one paging signal on the open spectrum,
   wherein the first reception attempt and the second reception attempt are implemented in a common, time-limited channel access interval of the open spectrum, and,
   depending on a first result of the first reception attempt: selectively activating a backoff for a further first reception attempt for the at least one synchronization signal burst and a further second reception attempt for the at least one paging signal.

2. The method of claim 1,
   wherein the first reception attempt and the second reception attempt are implemented in accordance with a timing schedule of a discontinuous reception cycle of the terminal,
   wherein the method further comprises:
   depending on the first result and depending on a second result: selectively activating an OFF duration of the discontinuous reception cycle.

3. The method of claim 2,
   wherein the OFF duration is activated at least if the first reception attempt succeeds and the second reception attempt fails.

4. The method of claim 1,
   wherein the backoff is activated if the first reception attempt fails,
   wherein the backoff is not activated if the first reception attempt succeeds.

5. The method of claim 1,
   wherein activating the backoff includes activating a backoff timer.

6. The method of claim 1,
   wherein the first reception attempt and the second reception attempt are implemented in accordance with a timing schedule of a discontinuous reception cycle of the terminal:
   wherein the backoff includes activating a further timing schedule of the discontinuous reception cycle which comprises a shorter OFF duration if compared to the timing schedule.

7. The method of claim 1,
   wherein the at least one synchronization signal burst comprises multiple synchronization signal bursts,
   wherein the multiple synchronization signal bursts are transmitted using frequency division multiplexing.

8. The method of claim 7, further comprising:
   determining a duration of the channel access interval, and
   based on said determining of the duration of the channel access interval, selecting a frequency-reuse factor of the frequency division multiplexing.

9. The method of claim 1,
   wherein the at least one synchronization signal burst is transmitted in a first part of the channel access interval using a first bandwidth of the open spectrum,
   wherein the at least one paging signal is transmitted in a second part of the channel access interval using a second bandwidth of the open spectrum which is different from the first bandwidth,
   wherein the second part is transmitted after the first part.

10. The method of claim 1,
    wherein the at least one synchronization signal burst is transmitted using a first bandwidth of the open spectrum,
    wherein the method further comprises:
    transmitting, to the terminal, at least one further synchronization signal burst using a further bandwidth of the open spectrum,
    wherein the further bandwidth is smaller than the first bandwidth.

11. The method of claim 1,
    wherein the at least one paging signal comprises multiple paging signals,
    wherein the multiple paging signals are transmitted using at least one of frequency division multiplexing and time division multiplexing.

12. The method of claim 1,
    wherein the at least one paging signal comprises a paging indicator.

13. The method of claim 12,
    wherein the at least one paging signal comprises a paging message associated with the paging indicator and transmitted after the paging indicator.

14. The method of claim 1,
    wherein the at least one synchronization signal burst and the at least one paging signal are transmitted in accordance with a timing schedule of a discontinuous reception cycle of the terminal.

15. The method of claim 1,
    wherein the at least one synchronization signal burst and the at least one paging signal are transmitted in adjacent time-frequency resources.

16. A method of operating a terminal, comprising:
    implementing a first reception attempt for multiple synchronization signal bursts on an open spectrum, wherein the multiple synchronization signal bursts are transmitted using frequency division multiplexing,
    implementing a second reception attempt for at least one paging signal on the open spectrum,
    wherein the first reception attempt and the second reception attempt are implemented in a common, time-limited channel access interval of the open spectrum,
    determining a duration of the channel access interval, and
    based on said determining of the duration of the channel access interval, selecting a frequency-reuse factor of the frequency division multiplexing.

* * * * *